(12) United States Patent
Schwerin et al.

(10) Patent No.: US 9,878,933 B2
(45) Date of Patent: Jan. 30, 2018

(54) METHOD FOR THE MANUFACTURE OF DOPED QUARTZ GLASS

(71) Applicant: Heraeus Quarzglas GmbH & Co. KG, Hanau (DE)

(72) Inventors: Malte Schwerin, Halle/Saale (DE); Martin Trommer, Bitterfeld (DE); Steffen Zwarg, Wolfen (DE)

(73) Assignee: Heraeus Quarzglas GmbH & Co. KG, Hanau (DE)

( * ) Notice: Subject to any disclaimer, the term of this patent is extended or adjusted under 35 U.S.C. 154(b) by 0 days.

(21) Appl. No.: 14/804,673

(22) Filed: Jul. 21, 2015

(65) Prior Publication Data

US 2016/0016839 A1     Jan. 21, 2016

(30) Foreign Application Priority Data

Jul. 21, 2014   (EP) .................................. 14177763

(51) Int. Cl.
| | | |
|---|---|---|
| C03C 3/06 | (2006.01) | |
| C03B 19/06 | (2006.01) | |
| C03B 37/014 | (2006.01) | |
| C03B 19/14 | (2006.01) | |
| C03C 13/04 | (2006.01) | |

(Continued)

(52) U.S. Cl.
CPC ........ C03B 19/066 (2013.01); C03B 19/1453 (2013.01); C03B 19/1461 (2013.01); C03B 23/045 (2013.01); C03B 23/095 (2013.01); C03B 23/099 (2013.01); C03B 37/0146 (2013.01); C03B 37/01446 (2013.01); C03B 37/01453 (2013.01); C03C 3/06 (2013.01); C03C 13/045 (2013.01); *C03B 2201/075* (2013.01); *C03B 2201/12* (2013.01); *C03B 2201/32* (2013.01); *C03B 2201/34* (2013.01); *C03B 2201/36* (2013.01); *C03B 2201/40* (2013.01); *C03B 2201/42* (2013.01); *C03C 2201/12* (2013.01); *C03C 2201/32* (2013.01); *C03C 2201/34* (2013.01); *C03C 2201/36* (2013.01); *C03C 2201/40* (2013.01); *C03C 2201/42* (2013.01); *C03C 2203/46* (2013.01)

(58) Field of Classification Search
CPC ............ C03C 2201/06; C03C 2201/08; C03C 2201/12; C03C 2201/14
USPC ......................................... 501/54
See application file for complete search history.

(56) References Cited

U.S. PATENT DOCUMENTS 5,679,125 A * 10/1997 Hiraiwa .............. C03B 19/1453
                                                                  65/17.3
6,990,836 B2 * 1/2006 Maida ................. C03B 19/1415
                                                                  65/17.4
(Continued)

FOREIGN PATENT DOCUMENTS

DE       10218864      10/2003
DE      102005059290    6/2007
(Continued)

*Primary Examiner* — Noah S Wiese
(74) *Attorney, Agent, or Firm* — Dicke, Billig & Czaja, PLLC

(57) ABSTRACT

One aspect relates to a method for the manufacture of doped quartz glass. Moreover, one aspect relates to quartz glass obtainable according to the method including providing a soot body, treating the soot body with a gas, heating an intermediate product and vitrifying an intermediate product.

12 Claims, 1 Drawing Sheet

(51) Int. Cl.
*C03B 23/045* (2006.01)
*C03B 23/09* (2006.01)

(56) References Cited

U.S. PATENT DOCUMENTS

| | | | |
|---|---|---|---|
| 7,964,522 B2* | 6/2011 | Moore | C03B 19/12 |
| | | | 501/54 |
| 2004/0118155 A1* | 6/2004 | Brown | C03B 19/01 |
| | | | 65/17.2 |
| 2006/0137397 A1* | 6/2006 | Bookbinder | C03B 19/1453 |
| | | | 65/17.3 |
| 2008/0053150 A1* | 3/2008 | Moore | C03B 19/12 |
| | | | 65/17.6 |
| 2015/0143851 A1* | 5/2015 | Trommer | C03B 19/1453 |
| | | | 65/397 |

FOREIGN PATENT DOCUMENTS

| | | |
|---|---|---|
| EP | 0139532 | 5/1985 |
| EP | 0161680 | 11/1985 |
| WO | 03101900 | 12/2003 |

* cited by examiner

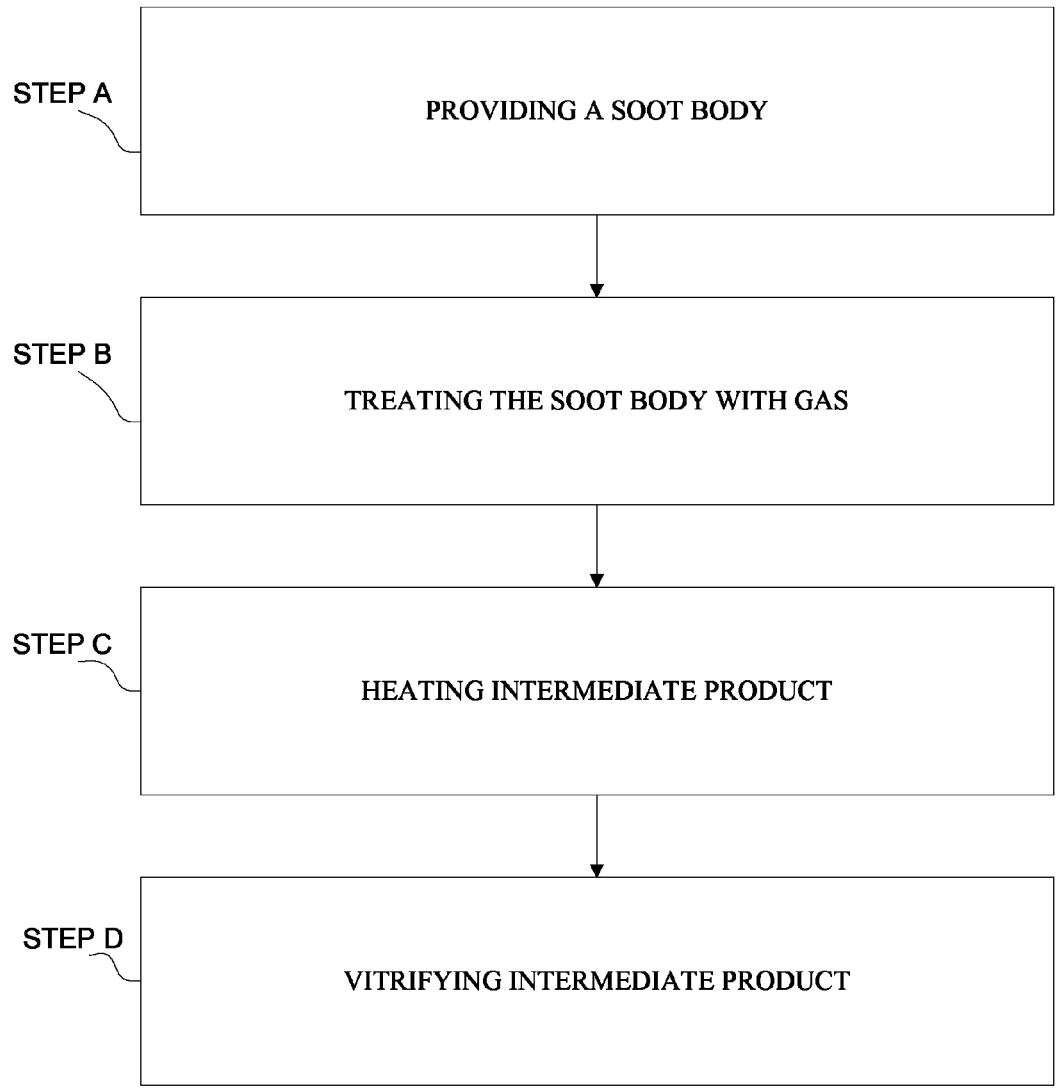

METHOD FOR THE MANUFACTURE OF DOPED QUARTZ GLASS

CROSS-REFERENCE TO RELATED APPLICATIONS

This Utility Patent Application claims priority to European Patent Application No. EP 14 177 763.1, filed on Jul. 21, 2014, which is incorporated herein by reference.

BACKGROUND

The present embodiments relate to a method for the manufacture of doped quartz glass. Moreover, the present embodiments relate to quartz glass obtainable according to the method and to the use thereof in the field of optics, for example as optical component.

The incorporation of foreign atoms into quartz glass allows the properties thereof to be affected. Accordingly, the doping of quartz glass with fluorine decreases the refractive index. Fluorine-doped quartz glass is therefore used, inter alia, for the manufacture of light-guiding refractive index structures in optical fibers, for example bending-insensitive fibers or in so-called "ultra low loss fibers". In this context, a number of methods are available to a person skilled in the art. Accordingly, a pre-mold that has a refractive index profile in radial direction and can be drawn directly to form the desired fiber can be used as semi-finished product for the optical fiber. Alternatively, a rod- or tube-shaped cylinder comprising at least one layer made of fluorine-doped quartz glass can be used. It can be elongated to form the fiber in an assembly together with other cylindrical components in coaxial arrangement. The fluorine-doped quartz glass cylinders are also used in laser and semi-conductor production.

Usually, the doping materials are rare earth elements, such as yttrium, and transition metals, such as aluminum and titanium, which are to attain the highest possible amplification performance. The amount of foreign ions that can be introduced into the quartz glass is limited though, since the presence of the doping agents in the quartz glass changes the refractive index thereof, which might lead to undesired side effects. In order to counteract these challenges, the quartz glass is additionally doped with fluorine, which is known to lower the refractive index of quartz glass. However, this also is associated with some production-related restrictions, which limit the amount of fluorine that can be introduced into the quartz glass and make a homogeneous distribution difficult to attain, especially if the wall thickness is high.

The introduction of foreign atoms is further complicated by hydroxyl groups (OH groups) being present in the soot body and needing to be removed during the manufacturing procedure, for example through various steps of drying. This, in turn, is associated with the problem that these need to be compatible with the doping methods. The prior art describes various approaches to a solution.

DE 102 18 864 C1 describes a method for the manufacture of a cylindrical quartz glass body having a low OH content, in which the soot body is subjected to a dehydration treatment.

WO 03/101900 A1 discloses a method for the manufacture of a doped optical fiber pre-mold, in which the soot body is first treated in a chlorine-containing atmosphere and is subjected to a fluorine-containing gas in a subsequent step.

EP 0 161 680 describes a method for the manufacture of a glass pre-mold for an optical fiber, in which the glass pre-mold is formed from fine glass particles containing $SiO_2$ and is then sintered in an atmosphere of He and $SiF_4$.

DE 10 2005 059 290 A1 relates to a method for the manufacture of a cylindrical form body made of transparent quartz glass through layer-by-layer deposition of $SiO_2$ particles on a substrate while forming a porous soot body. The soot body is then subjected to a negative pressure sintering treatment.

EP 0 139 532 B1 describes a method for the manufacture of a pre-mold made of glass for optical fibers by heating a soot-like glass pre-mold in the presence of a fluorine-containing gas.

In some examples, it has proven to be advantageous to vitrify the soot body at reduced pressure. As a result, the sintering process is associated with concurrent dehydrogenation of the soot body and any inclusions are prevented. Moreover, the formation of bubbles in the later quartz glass is minimized. However, the method is associated with a disadvantage in some instances in that some of the doping agents that are physically bonded in the soot body, in particular gaseous fluorine compounds, might desorb during the vitrification process, in the outer layers. This results in the formation of an undesired concentration gradient and fluorine depletion.

One way of counteracting fluorine depletion, in particular in the outer layers of the soot body, is to vitrify in a fluorine-containing atmosphere. This ensures that a sufficiently high partial pressure of fluorine-containing compounds, such as, for example, $SiF_4$ or HF, continues to be present in the gas phase during the vitrification such that no removal of fluorine from the soot body takes place during the vitrification. However, the conventional methods are disadvantageous in that the furnace materials, in which the vitrification in the presence of a fluorine-containing glass is performed, need to meet strict requirements. Due to the presence of highly reactive media, such as $SF_4$, or derived products, such as HF, in combination with the high process temperature, the furnace materials are exposed to extreme conditions. This causes strong wear and tear, which again results in high maintenance and up-keeping costs. In addition, the extreme requirements also limit the batch size as both the requirements and the stress on the furnace materials increase with increasing furnace size. Moreover, the selection of furnace materials is very limited, since these need to have not only high temperature and corrosion resistance, but also high purity. Typical furnace materials, in which vitrification can take place in an aggressive atmosphere, include, for example, inliner pipes made of quartz glass, but these are associated with a disadvantage in that they change shape over time. The higher the vitrification temperature, the larger is the wear and tear on the materials.

Moreover, vitrification in a gas atmosphere is associated with an elevated risk of incorporating bubbles into the glass, which has an adverse effect on the optical properties of the quartz glass.

There is therefore a need for a process that allows for vitrification of fluorine-doped soot bodies in a vacuum without concurrent formation of a concentration gradient of the dopant. Instead, high and homogeneous fluorine doping is to be attained.

BRIEF DESCRIPTION OF THE DRAWINGS

The accompanying drawings are included to provide a further understanding of embodiments and are incorporated in and constitute a part of this specification. The drawings illustrate embodiments and together with the description serve to explain principles of embodiments. Other embodiments and many of the intended advantages of embodiments will be readily appreciated as they become better understood by reference to the following detailed description. The elements of the drawings are not necessarily to scale relative to each other. Like reference numerals designate corresponding similar parts.

FIG. 1 is a flow chart illustrating a method in accordance with one embodiment.

DETAILED DESCRIPTION

In the following Detailed Description, reference is made to the accompanying drawings, which form a part hereof, and in which is shown by way of illustration specific embodiments in which the invention may be practiced. In this regard, directional terminology, such as "top," "bottom," "front," "back," "leading," "trailing," etc., is used with reference to the orientation of the Figure(s) being described. Because components of embodiments can be positioned in a number of different orientations, the directional terminology is used for purposes of illustration and is in no way limiting. It is to be understood that other embodiments may be utilized and structural or logical changes may be made without departing from the scope of the present invention. The following detailed description, therefore, is not to be taken in a limiting sense, and the scope of the present invention is defined by the appended claims.

It is to be understood that the features of the various exemplary embodiments described herein may be combined with each other, unless specifically noted otherwise.

One aspect of the present embodiments is to provide a process that allows for the manufacture of fluorine-doped quartz glass that has a high fluorine content and a homogeneous dopant distribution while utilizing the advantages of vacuum sintering. It is a further object of the present embodiments to provide a method for the manufacture of fluorine-doped quartz glass, whereby the quartz glass illustrates a high fluorine content and low bubble content.

One aspect provides a method for the manufacture of doped quartz glass having a high fluorine content, for example of >10,000 ppm, whereby fluorination and subsequent vitrification take place in different furnaces and the vitrification process is a vacuum vitrification.

Accordingly, one aspect is a method for the manufacture of doped quartz glass comprising the following steps of:
a) providing a soot body, whereby the soot body has a mean density in the range of 18 to 30%, relative to the relative density of quartz glass;
b) treating the soot body with a gas comprising a fluorine-containing compound in a process chamber while forming a fluorinated intermediate product (A), whereby the mean density of intermediate product (A) increases by maximally 30%, relative to the mean density of the soot body in step a);
c) heating fluorinated intermediate product (A) to a temperature in the range of 950 to 1,150° C. while forming a fluorinated intermediate product (B), whereby the mean density of fluorinated intermediate product (B) is maximally 80%, in one embodiment maximally 60%, of the relative density of quartz glass; and
d) vitrifying fluorinated intermediate product (B) in a process chamber while forming the doped quartz glass, whereby the pressure in the process chamber is lower than the pressure outside the process chamber.

In the scope of the present embodiments, a soot body shall be understood to be a porous blank that is obtained by means of depositing $SiO_2$ particles on a substrate and that is converted into the final quartz glass through vitrification. Generally, the structure of the $SiO_2$ soot body is sufficiently gas-permeable, which facilitates a uniform gas phase treatment or sintering. In the region of layers having a higher density, this is possible only to a limited degree, since these layers represent diffusion barriers that can give rise to a non-uniform treatment result in drying and sintering processes. This issue is evident because of the long diffusion pathways that exist, in particular, in $SiO_2$ soot bodies having a large volume and thick walls.

A large number of methods for the manufacture of this kind of soot body is available to a person skilled in the art. Pertinent examples include the so-called CVD processes, in particular the OVD and the VAD method. In the OVD method (Outside Vapor Deposition), $SiO_2$ particles are deposited on a cylinder jacket surface of an elongated substrate that rotates about its longitudinal axis. The substrate can consist, for example, of ceramics, graphite or quartz glass in this context. In the VAD method (Vapor Axial Deposition) the $SiO_2$ particles are built-up on a disc-shaped rotating substrate in the direction of the longitudinal axis of the soot body. In both methods, the $SiO_2$ particles can be formed, for example, through flame hydrolysis of $SiCl_4$ in a oxyhydrogen gas flame and can be deposited layer-by-layer on the substrate while the soot body is being formed.

Process Step a)

The soot body provided in step a) of the method according to one embodiment has a mean density in the range of 18 to 30%, relative to the relative density of quartz glass. This is based on the density of quartz glass being 2.21 $g/cm^3$. The density attained depends, inter alia, on the distance of the burners from the deposition surface, the set temperature, the stoichiometry of the gases, and the burner geometry. Pertinent settings are known to a person skilled in the art. The density of the soot body can be determined using known methods. For example the local density of the soot body can be determined by means of computer tomography methods by recording sectional images of the soot body. The mean density then results from averaging over all measuring points.

In one embodiment of the method, the soot body has a specific BET surface of 7 to 16 $m^2/g$, and in one embodiment 10 to 15 $m^2/g$, determined according to DIN-ISO 9277: 2003-5.

The soot body in step a) can be dried before treatment using a gas that has a fluorine-containing compound in order to remove impurities, such as, for example, hydroxide groups (OH groups), that may be present in the soot body. The drying can take place by thermal and/or chemical means. An embodiment, in which the soot body is dried in step a) at a temperature in the range of 700 to 1,100° C. by thermal and/or chemical means, is particularly preferred in one embodiment.

In one embodiment, it is preferred to perform the chemical drying of the soot body in the presence of a chlorine-containing compound. The use of chlorine ($Cl_2$) is preferred in another embodiment.

In one embodiment, the thermal drying of the soot body is performed in the presence of one or more inert gases. This prevents re-contamination of regions of the soot body that have already been cleaned. In one embodiment, the inert gas is selected from the group consisting of He, Ar, $N_2$ as well as mixtures thereof.

An embodiment, in which the soot body is dried in step a) first in the presence of an inert gas and then in the presence of a chlorine-containing compound is preferred in one case, whereby the temperature in either case is in the range of 700 to 1,000° C.

Process Step b)

The soot body is doped in step b) of the method according to one embodiment by treating the soot body with a gas that has a fluorine-containing compound. In this context, the fluorine-containing compound can just as well be a mixture of multiple fluorine-containing compounds. In one embodiment, the fluorine-containing compound is selected from the group consisting of $F_2$, $SiF_4$, $CF_4$, $C_2F_6$, $SF_6$, $C_3F_8$, $NF_3$, $ClF_3$, $BF_3$, fluoro-chloro hydrocarbons as well as mixtures thereof. In one embodiment, the fluorine-containing compound is selected from the group consisting of $F_2$, $SiF_4$, $CF_4$, $C_2F_6$, $SF_6$, and $NF_3$.

A particularly homogeneous distribution of the doping agent in the soot body was attained when the gas has at least 15 vol. % of the fluorine-containing compound, relative to the total volume of the gas. Therefore, in one embodiment of the method, the fraction of fluorine-containing compound in the gas is 15 to 100 vol. %, and in one embodiment 60 to 100 vol. %, each relative to the total volume of the gas. In this context, the amount of fluorine-containing compound can vary depending on the type of fluorine-containing compound. Accordingly, for example, if $CF_4$ and/or $C_2F_6$ are used as fluorine-containing compound, a fraction of 15 to 50 vol. % of the gas being the fluorine-containing compound, relative to the total volume of the gas, is preferred in one embodiment. Moreover, the fraction of the fluorine-containing compound in the gas used for treatment of the soot body can be influenced by the amount of doping agent to be introduced into the soot body and by the selected reaction conditions.

It has proven to be advantageous in one embodiment to perform the treatment of the soot body in step b) of the method at elevated temperature. As a result, a homogeneous distribution of the doping agent and a low degree of undesired impurities can be attained. Therefore, an embodiment, in which the treatment of the soot body in step b) takes place at a temperature in the range of 700 to 1,100° C., is preferred in one case. In this context, the temperature or temperature range, at or in which the treatment takes place, should be selected taking into consideration the fluorine-containing compound that is being used. If $SiF_4$ is used as fluorine-containing compound, the temperature in one embodiment is in the range of 800 to 900° C. In contrast, it has proven advantageous in one embodiment to perform the treatment of the soot body with $CF_4$ as fluorine-containing compound at a temperature in the range of 950 to 1,100° C. It should be noted in this context that the temperatures specified above are meant to be guiding values and can vary depending on the type of implementation and the process chamber.

Process Step c)

Following the treatment of the soot body in a fluorine-containing atmosphere, the fluorinated intermediate product (A) thus obtained is heated to a temperature in the range of 950 to 1,150° C. while forming a fluorinated intermediate product (B). The treatment takes place with concurrent compaction of the fluorinated intermediate product (A) such that the mean density of the resulting fluorinated intermediate product (B) is maximally 80%, in one embodiment maximally 60%, of the relative density of quartz glass. In one embodiment, the mean density of the fluorinated intermediate product (B) is 40 to 80%, in one embodiment 50 to 60%, of the relative density of quartz glass. The temperature to which the fluorinated intermediate product (A) is heated depends on the desired degree of compaction and the fluorine-containing compound used presently. As a result, the fluorine thus introduced is affixed in the $SiO_2$ matrix of the fluorinated intermediate product (B), while not all pores are closed yet at this time. This facilitates a gas exchange and, for example, any remaining impurities or possible gas inclusions can be removed. It has proven to be advantageous in one embodiment to heat the fluorinated intermediate product (A) in step c) of the method to a temperature that is at least 100° C. below the later vitrification temperature. Therefore, an embodiment, in which the temperature in step c) is at least 100° C., in one embodiment 150° C., below the vitrification temperature of the fluorinated intermediate product (B), is preferred.

Moreover, it has proven advantageous in some embodiments to dry the fluorinated intermediate product (B) in a chlorine-containing atmosphere. This results in substitution of the OH groups in the intermediate product by chlorine, which leads to lesser attenuation in the fiber later on. Therefore, an embodiment, in which the fluorinated intermediate product (B) is dried in a chlorine-containing atmosphere is advantageous, whereby the drying takes place at a temperature in the range of 700 to 1,100° C. It is preferred in one embodiment for the chlorine-containing atmosphere to have a chlorine-containing compound, such as $Cl_2$. An embodiment, in which the fraction of the chlorine-containing compound is 5 to 60 vol. %, relative to the total volume of the gas, is also preferred in one embodiment.

Process Step d)

The fluorinated intermediate product (B) is vitrified in a concluding step d) of the method according to one embodiment, whereby the pressure inside the process chamber, in which the vitrification takes place, is lower than the pressure outside the process chamber. In one embodiment, the vitrification temperature in step d) is in the range of 1,200 to 1,500° C., and in one embodiment 1,250 to 1,350° C. In order to prevent the formation of bubbles in the later quartz glass, it has proven advantageous in one embodiment to have the pressure inside the process chamber during the vitrification be lower than outside the process chamber, that is, to perform the vitrification at reduced pressure. This has another advantage in one embodiment in that the material of the process chamber is not attacked by aggressive and corrosive gases and thus is subject to less wear and tear. Therefore, an embodiment, in which the vitrification in step d) takes place at a pressure of less than 1 mbar, is preferred in one embodiment. Accordingly, the pressure inside the process chamber should be less than 1 mbar in one embodiment.

In order to optimize the manufacturing process of the quartz glass and to be gentle on the materials, of the process chamber, it has proven to be advantageous in one embodiment to have the doping of the soot body and the vitrification of the fluorinated intermediate product take place in different process chambers. Therefore, according to methods according to one embodiment, the vitrification in step d) takes place in a second process chamber that is different from the first process chamber. As a result, each of the process chambers can be optimized for the respective process steps and excessive stress on the materials, for example from aggressive and corrosive gases at high temperatures, is prevented. Therefore, an embodiment, in which the vitrification in step d) takes place in a second process chamber that differs from the first process chamber, in which steps b) and c) are performed, is preferred in one embodiment. In this context, the second process chamber can, for example, be a multi-chamber furnace, in which the vitrification of the fluorinated intermediate product (B) takes place zone-by-zone. In one embodiment, the second process chamber is not exposed to fluorine-containing gases.

It is also preferred in one embodiment that the second process chamber is a vitrification furnace, and in one case, a multi-chamber sintering furnace. The furnaces are known to a person skilled in the art and can be used in the method according to one embodiment to suit the respective requirements regarding the size and shape of the soot body.

In one embodiment, process steps b) and c) take place in an isothermal furnace fitted with a quartz glass process tube. The furnaces are known to a person skilled in the art from the prior art.

During the transport of the fluorinated intermediate product (B) from the first process chamber into the second process chamber, the water content of the atmosphere can lead to diffusion of $H_2O$ into the fluorinated intermediate product (B) and ensuing contamination with OH groups and, concurrently, to inhomogeneous axial and radial distribution of the OH group concentration in the later quartz glass. Moreover, the presence of OH groups in the fluorinated intermediate product (B) is disadvantageous in one embodiment in that these groups show high absorption at the common working wavelengths of optical fibers and thus have an adverse effect on the quality of the later product. In order to reduce the OH concentration in the fluorinated intermediate product (B), it has therefore proven to be advantageous in one embodiment to subject the fluorinated intermediate product (B) to a drying step before vitrification.

Therefore, an embodiment in which the fluorinated intermediate product (B) is subjected to another drying step in the second process chamber before vitrification is preferred in one case, whereby the drying takes place at a temperature in the range of 700 to 1,200° C. It has been evident that impurities can be removed by the procedure. Heating the fluorinated intermediate product (B) to a temperature above 700° C. releases OH groups, which migrate ahead of the heating front and escape from the intermediate product due to the porosity of the intermediate product. To ensure that regions of the intermediate product that have already been cleaned do not again react with released water, these can be removed by rinsing with an inert gas or through suction. The measures can be performed in the second process chamber such that no laborious re-configuration is required. To prevent renewed contamination, it has proven advantageous in one embodiment to have the pressure during the drying step inside the second process chamber be lower than the pressure outside the second process chamber. Therefore, an embodiment, in which the pressure during the drying step in the second process chamber is less than 1 mbar, is preferred in one embodiment.

In one embodiment, the method includes the following steps:

a) providing a soot body, whereby the soot body has a mean density in the range of 18 to 30%, relative to the relative density of quartz glass;

a-1) drying the soot body at a temperature in the range of 700 to 1,050° C.;

a-2) as an option, chemically drying the soot body at a temperature in the range of 700 to 1,050° C. in the presence of a chlorine-containing gas;

b) treating the soot body with a gas comprising a fluorine-containing compound in a first process chamber while forming a fluorinated intermediate product (A), whereby the mean density of the fluorinated intermediate product (A) increases by maximally 30%, relative to the mean density of the soot body in step a);

c) heating the fluorinated intermediate product (A) to a temperature in the range of 950 to 1,150° C. while forming a fluorinated intermediate product (B), whereby the mean density of the fluorinated intermediate product (B) is maximally 80%, and in one case maximally 60%, of the relative density of quartz glass;

c-1) as an option, chemically drying the fluorinated intermediate product (B) at a temperature in the range of 700 to 1,100° C. in the presence of a chlorine-containing gas;

c-2) transferring the fluorinated intermediate product (B) into a second process chamber;

c-3) as an option, heating the fluorinated intermediate product (B) to a temperature above 1,000° C., in one embodiment 1,000 to 1,200° C., whereby the pressure inside the process chamber in one embodiment is lower than outside the process chamber; and d) vitrifying the fluorinated intermediate product (B) in the second process chamber, whereby the pressure inside the process chamber is lower than the pressure outside the process chamber, while forming the doped quartz glass.

In one embodiment, the pressure during the heating in step c-3) inside the process chamber is lower than the pressure outside the process chamber.

Doped quartz glass that can be obtained according to the method is another embodiment. The quartz glass is characterized by homogeneous doping with fluorine, even at high fluorine contents, and a low content of bubbles.

The properties of the quartz glass, such as, for example, refractive index and absorption peaks, can be influenced by the presence of selected foreign atoms in the quartz glass. Therefore, an embodiment, in which the quartz glass has further dopants aside from fluorine is preferred in one embodiment, whereby the doping agent is selected in one embodiment from the group consisting of $Al_2O_3$, $Yb_2O_3$, $Er_2O_3$, $NbO_2$, $TiO_2$, $Ce_2O_3$, $Y_2O_3$ as well as mixtures thereof.

A person skilled in the art would be aware that the refractive index of quartz glass can be set by specific doping with fluorine. However, a person skilled in the art often faces a challenge in that the amount of fluorine present in the quartz glass is limited by the manufacturing process, since, for example, fluorine is removed again from the soot body through corresponding process steps such as drying and vitrifying in a vacuum. In contrast, the quartz glass according to one embodiment is characterized by its high fluorine content and homogeneous distribution thereof in the quartz glass. Accordingly, the fluorine content in the quartz glass is 5,000 to 20,000 ppm, in one embodiment 8,000 to 18,000 ppm in one embodiment, each relative to weight fractions.

Quartz glass, and doped quartz glass in particular, is applied widely in optics and analytics. Therefore, the use of the doped quartz glass according to one embodiment as optical component, optical fiber mold or as part of an optical fiber is another embodiment.

The present embodiments are illustrated in more detail below by means of the examples, though these shall not be construed as to limit the spirit of the invention.

EXAMPLES

| | Example 1 | Example 2 | Example 3 | Ref. exam. |
|---|---|---|---|---|
| Soot body | | | | |
| BET (m²/g) | 11 | 16 | 9 | 13 |
| mean density | 28.1 | 26.2 | 28.8 | 27.5 |

-continued

|  | Example 1 | Example 2 | Example 3 | Ref. exam. |
|---|---|---|---|---|
| (%) Drying |  |  |  |  |
| Temp. (° C.) | 800 | 800 | 900 | 800 |
| N$_2$ conc. (%) | 100 | 100 | 100 | 100 |
| Time (h) | 15 | 15 | 15 | 15 |
| Fluorination |  |  |  |  |
| SiF$_4$ conc. (%) | 50 | 50 | 100 | 50 |
| N$_2$ conc. (%) | 50 | 50 | 0 | 50 |
| Temp. (° C.) | 800 | 800 | 900 | 800 |
| Time (h) | 8 | 8 | 8 | 8 |
| Pre-sintering |  |  |  |  |
| SiF$_4$ conc. (%) | 0 | 0 | 0 | — |
| N$_2$ conc. (%) | 100 | 100 | 100 | — |
| Temp. (° C.) | 1000 | 1000 | 1100 | — |
| Time (h) | 8 | 4 | 8 | — |
| Chem. drying |  |  |  |  |
| Temp. (° C.) | — | 1000 | — | 800 |
| N$_2$ conc. (%) | — | 80 | — | 80 |
| Cl$_2$ conc. (%) | — | 20 | — | 20 |
| Time (h) | — | 4 | — | 8 |
| BET (m$^2$/g) | 7 | 9 | 5 | 11 |
| mean density (%) | 50 | 55 | 80 | 29 |
| Sintering |  |  |  |  |
| Temp. (° C.) | 1300 | 1300 | 1300 | 1350 |
| Fluorine content (ppm)[a] | 12390 | 11860 | 16850 | 14490 |
| Lowering RI (10$^{-3}$)[b] | −4.8 | −4.6 | −6.5 | −5.6 |
| Δ RI (10$^{-3}$)[c] | 0.72 | 0.65 | 0.92 | 1.6 |
| Bubble content[d] | ++ | ++ | + | − |

[a] mean fluorine content, each relative to weight fractions, as determined by means of electron micro-probe and WDX
[b] mean reduction of the refractive index, as determined by means of profile measuring device from Photon Kinetics.
[c] Δ RI = RI_max − RI_min
[d] The bubble content was determined by visual analysis based on reference samples.

The selected starting material was a SiO$_2$ soot body with a mass of 150 kg and a wall thickness of 140 mm (from internal surface to external surface). The drying of the soot body, the fluorination, the pre-sintering, and the chemical drying too place in a doping furnace. The sintering was performed at reduced pressure (<1 mbar) in a multi-chamber furnace.

As is evident from the examples, the method according to various embodiments can be used to reduce the bubble content of the quartz glass markedly, which, in turn, has a beneficial effect on the optical properties of the quartz glass, which possesses markedly fewer faults as a result.

Moreover, the radial refractive index gradient, which is a measure of the radial homogeneity of the refractive index distribution, can be reduced. The chlorination step following the fluorination improves the radial homogeneity even further. It also leads to process stabilization, since renewed incorporation of OH, during the transfer of the body from one process chamber into the other, is prevented. By this means, quartz glass bodies comprising an OH content of less than 0.1 ppm can be produced.

Although specific embodiments have been illustrated and described herein, it will be appreciated by those of ordinary skill in the art that a variety of alternate and/or equivalent implementations may be substituted for the specific embodiments shown and described without departing from the scope of the present invention. This application is intended to cover any adaptations or variations of the specific embodiments discussed herein. Therefore, it is intended that this invention be limited only by the claims and the equivalents thereof.

What is claimed is:

1. A method for the manufacture of doped quartz glass, comprising:
    a) providing a soot body, whereby the soot body has a mean density in the range of 18 to 30% relative to the relative density of quartz glass;
    b) treating the soot body with a gas comprising a fluorine-containing compound in a process chamber while forming a fluorinated intermediate product (A), whereby the mean density of intermediate product (A) increases by maximally 30% relative to the mean density of the soot body in step a), wherein the treatment of the soot body in step b) takes place at a temperature in a range of 700 to 1,000° C.;
    c) heating fluorinated intermediate product (A) in the absence of chlorine to a temperature in the range of 950 to 1,150° C., and above the temperature used for the treatment of the soot body in step b), while forming a fluorinated intermediate product (B), whereby the mean density of fluorinated intermediate product (B) is 40 to 80% of the relative density of quartz glass; and
    d) vitrifying the fluorinated intermediate product (B) in a process chamber, whereby the pressure inside the process chamber is lower than the pressure outside the process chamber, while forming the doped quartz glass.

2. The method according to claim 1, whereby the mean density of fluorinated intermediate product (B) is maximally 60% of the relative density of quartz glass.

3. The method according to claim 1, characterized in that the fluorine-containing compound is selected from the group consisting of F$_2$, SiF$_4$, CF$_4$, C$_2$F$_6$, SF$_6$, C$_3$F$_8$, NF$_3$, ClF$_3$, BF$_3$, and fluoro-chloro hydrocarbons.

4. The method according to claim 1, characterized in that the fraction of fluorine-containing compound in the gas is 15 to 100 vol. % or 60 to 100 vol. %, each relative to the total volume of the gas.

5. The method according to claim 1, characterized in that the vitrification temperature in step d) is in the range of 1,200 to 1,500° C.

6. The method according to claim 1, characterized in that the mean density of the fluorinated intermediate product (B) is 50 to 60%, of the relative density of quartz glass.

7. The method according to claim 1, characterized in that the soot body is dried in step a) at a temperature in the range of 700 to 1,100° C. by thermal and/or chemical means.

8. The method according to claim 1, characterized in that the vitrification in step d) takes place in a second process chamber that differs from the first process chamber, in which steps b) and c) are performed.

9. The method according to claim 8, characterized in that the fluorinated intermediate product (B) is subjected to another drying step in the second process chamber before vitrification, whereby the drying takes place at a temperature in the range of 700 to 1,200° C.

10. The method according to claim 1, further comprising:
    a-1) drying the soot body at a temperature in the range of 700 to 1,050° C.;
    a-2) as an option, chemically drying the soot body at a temperature in the range of 700 to 1,050° C. in the presence of a chlorine-containing gas;
    c-1) as an option, chemically drying the fluorinated intermediate product (B) at a temperature in the range of 700 to 1,100° C. in the presence of a chlorine-containing gas;

c-2) transferring the fluorinated intermediate product (B) into a second process chamber; and c-3) as an option, heating the fluorinated intermediate product (B) to a temperature above 1,000° C. whereby the pressure inside the process chamber is lower than the pressure outside the process chamber.

11. The method according to claim 1, characterized in that the second process chamber is one of a vitrification furnace and a multi-chamber sintering furnace.

12. A method for the manufacture of doped quartz glass, comprising:

providing a soot body, the soot body comprising a mean density in the range of 18 to 30% relative to the relative density of quartz glass;

treating the soot body with a gas comprising a fluorine-containing compound in a process chamber while forming a first fluorinated intermediate product, the mean density of the first fluorinated intermediate product increasing by maximally 30% relative to the mean density of the provided soot body, wherein the treatment of the soot body in step b) takes place at a temperature in a range of 700 to 1,000° C.;

heating the first fluorinated intermediate product in the absence of chlorine to a temperature in the range of 950 to 1,150° C., and above the temperature used for the treatment of the soot body in step b), while forming a second fluorinated intermediate product, the mean density of the second fluorinated intermediate product being 40 to 80% of the relative density of quartz glass; and vitrifying the second fluorinated intermediate product in a process chamber, the pressure inside the process chamber being lower than the pressure outside the process chamber, while forming the doped quartz glass.

* * * * *